United States Patent [19]

Yang et al.

[11] Patent Number: 5,692,694
[45] Date of Patent: Dec. 2, 1997

[54] METHOD AND APPARATUS FOR IMPLEMENTING SERVO CONTROL IN VIDEO CASSETTE RECORDERS

[75] Inventors: Seok-kyun Yang; Chang-hwan Kim, both of Seoul, Rep. of Korea

[73] Assignee: Samsung Electronics Co., Ltd., Kyungki-do, Rep. of Korea

[21] Appl. No.: 592,670

[22] Filed: Jan. 26, 1996

[30] Foreign Application Priority Data

Jan. 27, 1995 [KR] Rep. of Korea .................. 95-1453

[51] Int. Cl.$^6$ ...................................... G11B 15/43
[52] U.S. Cl. ........................ 242/334.2; 242/352.2
[58] Field of Search .................... 242/334, 334.2, 242/334.3, 334.6, 352, 352.1, 352.2, 354; 318/6, 7; 360/96.3, 96.4

[56] References Cited

U.S. PATENT DOCUMENTS

| | | | |
|---|---|---|---|
| 3,892,038 | 7/1975 | Studer | 242/334.1 |
| 4,341,363 | 7/1982 | Inatome | 242/334.1 |
| 4,731,679 | 3/1988 | O'Gwynn et al. | 242/334 |
| 4,786,992 | 11/1988 | Tajima et al. | 242/352.1 |
| 5,039,027 | 8/1991 | Yanagihara et al. | 242/334.2 |
| 5,125,592 | 6/1992 | Sato | 318/7 |
| 5,138,504 | 8/1992 | Nishijima et al. | 242/334.1 |
| 5,248,112 | 9/1993 | Rodal et al. | 242/352.2 |
| 5,540,398 | 7/1996 | Nishida et al. | 242/334.2 |

FOREIGN PATENT DOCUMENTS 2 098 364   11/1982   United Kingdom ............... 242/334.3

*Primary Examiner*—John P. Darling
*Attorney, Agent, or Firm*—Sughrue, Mion, Zinn, Macpeak & Seas, PLLC

[57] ABSTRACT

A method and apparatus for implementing servo control in a video cassette recorder (VCR) including reel motors. According to the invention, the VCR is controlled so that a control equation $$F_t' = F_s' + \frac{B_c}{R_c} \omega_c$$

is satisfied. Also, the tension of a tape is directly detected to actively control a take-up reel motor so that a force $F_t$ reflecting a tension in the tape on the take-up reel motor side of the VCR and a force $F_s'$ reflecting a tension in the tape on a supply reel side of the VCR equal each other, the two forces $F_1'$ and $F_2'$ being centered on a capstan motor. In addition, a servo system of the VCR is designed so that a term $$\frac{B_c}{R_c} \omega_c$$

of the control equation is minimized. If the servo system is controlled to satisfy the control equation, a motional equation of the capstan motor is simplified to the following equation $$J_c \frac{d\omega_c}{dt} = T_c,$$

in which $$\frac{d\omega_c}{dt}$$

is very small to decrease a torque $T_c$ applied to the capstan motor.

8 Claims, 3 Drawing Sheets

METHOD AND APPARATUS FOR IMPLEMENTING SERVO CONTROL IN VIDEO CASSETTE RECORDERS

BACKGROUND OF THE INVENTION

The present invention relates to a video cassette recorder (VCR) having reel motors, and particularly to a method and apparatus for implementing servo control in a VCR in which a take-up reel motor is actively controlled to reduce a load applied to a capstan motor.

For a general high-performance VCR having reel motors to be capable of reel servo control, the VCR must incorporate a switching circuit for selecting a tension controller and a speed controller according to a particular mode. During the reproduction of video information on the tape, the tape travels in accordance with the rotation of a capstan motor, and a reel motor adjusts a tension of the tape which is transported under the control of the tension controller. During high speed control, the tape is transported at higher speeds by the reel motor which is controlled by the speed controller.

FIG. 1 shows a conventional servo control apparatus which illustrates a tape travelling state in a VCR. In FIG. 1, a tension pole 1 detects a tension of a tape 2 when the tape is being wound in an inclined state on a drum 3. A capstan motor shaft 4 and a pinch roller 5, which closely contact each other, are installed on a side of the drum 3 opposite to the side where the tension pole 1 is located. The tape 2 travels between the capstan motor shaft 4 and the pinch roller 5. When video information is being reproduced from the tape, the drum 3 and the capstan motor shaft 4 rotate at a constant speed according to the rotation of a capstan motor (not shown) so as to move the tape 2 at a constant speed.

Guide rollers 6 which are installed around the drum 3 guide the tape 2 as it travels along the surface of drum 3 in order to prevent the tape 2 from twisting. A supply reel motor 7, shown in FIG. 1, is controlled by a first drive circuit 9 and transfers the tape 2 towards the drum 3 via tension pole 1. A first tension controller 11 is connected to the first drive circuit 9. The first tension controller 11 controls first drive circuit 9 according to a tension $T_d$ of the tape which is detected by the tension pole 1 and a rotational angular speed $\omega_s$ which is detected in the supply reel motor 7. The supply reel motor 7 which is controlled by the first drive circuit 9 adjusts a pull of the tape 2 and consistently maintains a tension of the supplied tape.

A take-up reel motor 8 which is controlled by a second drive circuit 10, winds the tape 2 which is taken up via the guide rollers 6. An adder 12 is connected to a second drive circuit 12. The adder 12 adds a capstan error signal and an output signal of a second tension controller 13, and outputs the added result to the second drive circuit 10. The capstan error signal input to the adder 12 is for the purpose of managing a sudden change of a speed of the capstan motor. The second tension controller 13 outputs a control signal according to a radius $R_t$ of a reel which is detected from take-up reel motor in which $R_t$ is proportional to an mount of the wound tape on the reel, not an actual tension $T_d$ of tape 2 detected by tension pole 1. Here, the second tension controller 13 stores therein an output value which is experimentally preset according to a radius of the reel. The take-up reel motor 8 which is controlled by the second drive circuit 10 maintains a consistent tension of tape 2 as it is taken up.

However, in the above described conventional servo control apparatus, only the capstan motor plays a role in moving the tape at a constant speed during the reproduction of video information thereon resulting in a large load being applied to the capstan motor. Thus, a large portion of the capstan motor's load bearing capacity is needed to handle the large load. Meanwhile, in the above described conventional servo control apparatus, the take-up reel motor need only be designed to pull the tape appropriately. Accordingly, a large load is not applied to the take-up reel motor.

Also, the supply reel side of the servo control apparatus detects an actual tension of the tape to adjust a tension of the tape, while the take-up reel side of the conventional servo control apparatus pulls the tape according to the preset value depending upon the radius of the reel. As a result, differing tensions on both ends of the tape are centered on the capstan motor causing an increase in the load applied to the capstan motor.

SUMMARY OF THE INVENTION

Therefore, to solve the above stated problems, it is an object of the present invention to provide a method and apparatus for implementing servo control in a VCR so as to actively control a take-up reel motor which is controlled by a tension controller during the reproduction of video information in order to reduce a load of a capstan motor so as to enable the use of a smaller portion of the capstan motor's load bearing capacity.

To accomplish the above object of the present invention, there is provided a method and apparatus for implementing servo control in a VCR according to the present invention, wherein a tension of a tape is directly detected to actively control a take-up reel motor in order to make a tension $F_t'$ of the tape in the take-up reel side and a tension $F_s'$ of the tape in a supply reel side equal each other, the tensions $F_t'$ and $F_s'$ centering on a capstan motor. Also, a servo control system of the VCR is designed so that a term $$\frac{B_c}{R_c} \omega_c$$

of the servo control system of the VCR is minimized in which $B_c$ is a damping constant of the capstan motor, $R_c$ is an axial radius of the capstan motor, and $\omega_c$ is a rotational angular speed of the capstan motor, to thereby make a motional equation of the capstan motor $$J_c \frac{d\omega_c}{dt} = T_c$$

in order to reduce torque applied to the capstan motor in which $J_c$ is an inertial moment of the capstan motor and $T_c$ is a torque of the capstan motor.

There is also provided a method and apparatus for implementing servo control in a VCR according to the present invention, wherein a take-up reel motor is controlled to satisfy the following equation:

$$T_r = (1 + \mu_r) \cdot \left\{ (1 + \mu_s) \cdot T_d \cdot \frac{\omega_c}{\omega_r} \cdot R_c + B_c \cdot \frac{\omega_c}{\omega_r} \cdot \omega_c \right\}$$

in which $T_d$ is a tension of a tape, $\omega_c$ is a rotational angular speed of a capstan motor, $\omega_r$ is a rotational angular speed of a take-up reel motor, $T_r$ is a torque of the take-up reel motor, $\mu_r$ is a tape frictional coefficient from a take-up reel to the capstan motor, $\mu_s$ is a tape frictional coefficient from a supply reel to the capstan motor, $R_c$ is an axial radius of the capstan motor and $B_c$ is a damping constant of the capstan motor, where $\mu_r$, $\mu_s$, $R_c$ and $B_c$ are predetermined parameters in the servo control system.

BRIEF DESCRIPTION OF THE DRAWINGS

The preferred embodiments are described below with reference to the drawings wherein.

DETAILED DESCRIPTION OF THE PREFERRED EMBODIMENT

A preferred embodiment of the present invention will be described below in more detail with reference to the accompanying drawings FIGS. 2 through 4.

Figure 1:
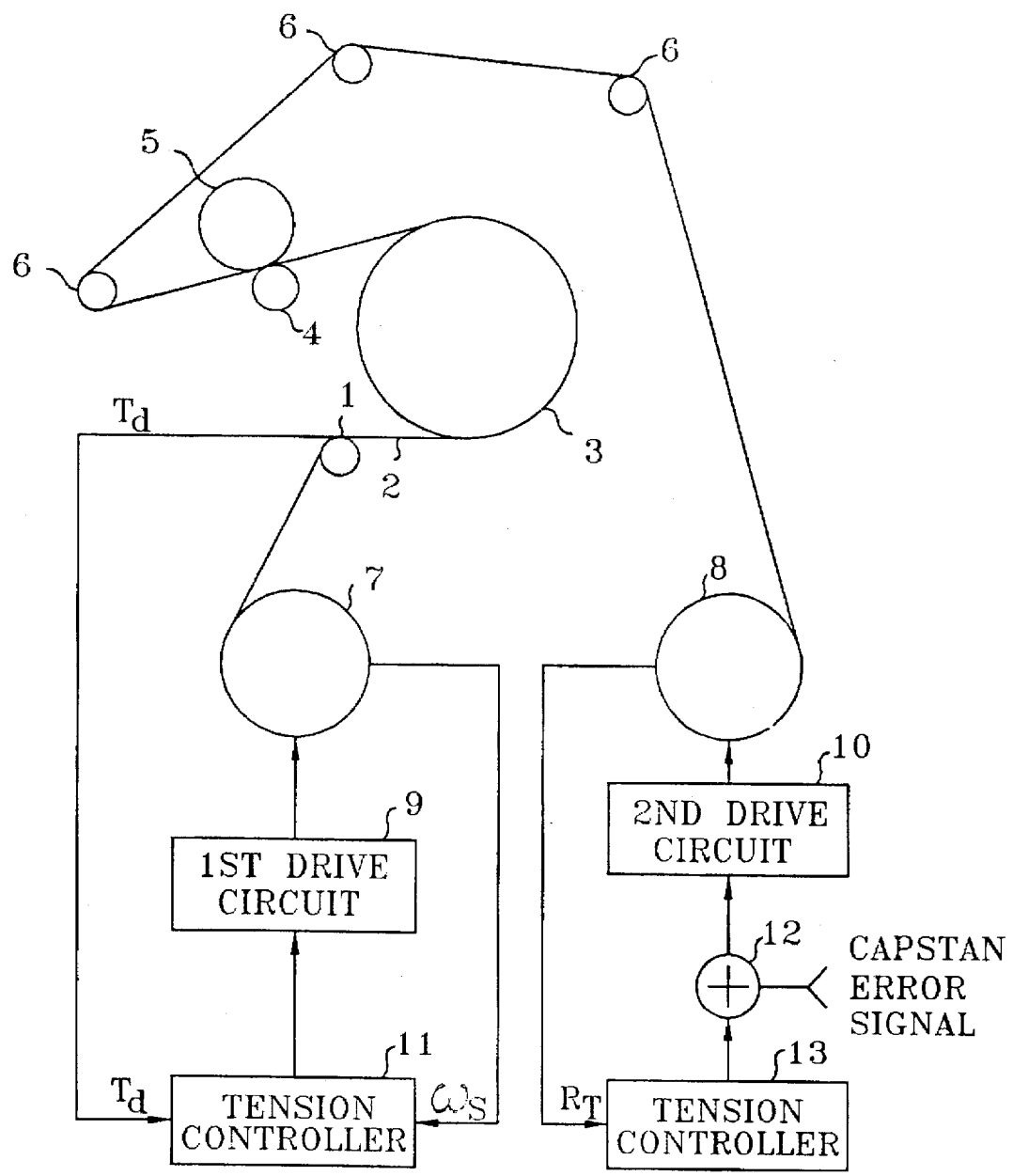
FIG. 1 shows a tape travelling state in a VCR having a conventional servo control apparatus.
Figure 2:
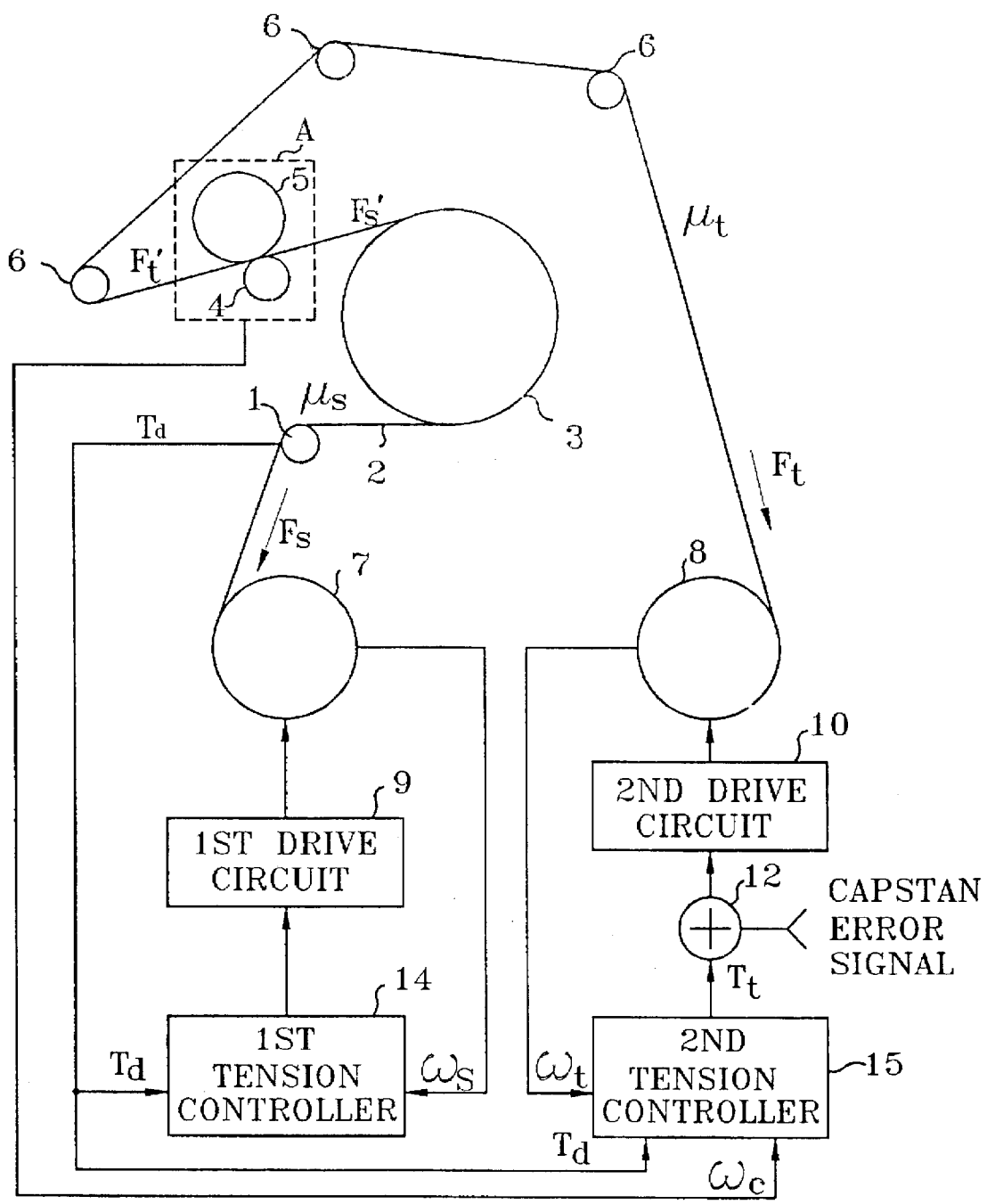
FIG. 2 shows a tape travelling state in a VCR having a servo control apparatus according to the present invention.

In FIG. 2, which shows a tape travelling state in a VCR having a servo control apparatus according to the present invention, the operation of the capstan motor shaft 4, the pinch roller 5 and the guide roller 6 is the same as their operation in the conventional servo control apparatus which is depicted in FIG. 1. Also, a first tension controller 14 receives a tension $T_d$ of the tape detected in tension pole 1 and a rotational angular spaced $\omega_r$ of the supply reel motor and drive circuit 9 in order to enable supply reel motor 7 to consistently maintain the tension of the supplied tape 2.

A characteristic of the present invention resides in a second tension controller 15 on the take-up reel side. The second tension controller 15 on the take-up reel side receives a rotational angular speed $\omega_t$ detected in a take-up reel motor 8, a tension $T_d$ of the tape detected in tension pole 1, and a rotational angular speed $\omega_c$ detected in capstan motor shaft 4, and then outputs a torque $T_t$ of the take-up reel motor to an adder 12 as a control signal. Adder 12 adds the control signal and a capstan error signal of the capstan motor and outputs the added result to a second drive circuit 10 which controls the take-up reel motor 8.

The method and apparatus according for implementing servo control in a VCR to the present invention does not control the take-up reel motor by a control signal which is preset according to a radius of the reel, but rather actively controls the take-up reel motor by detecting a tension of the tape directly. Since the tensions of the tape in the take-up reel side that are centered on the capstan motor, and the supply reel side are identically adjusted a load applied to the capstan motor can be reduced.

Figure 3:
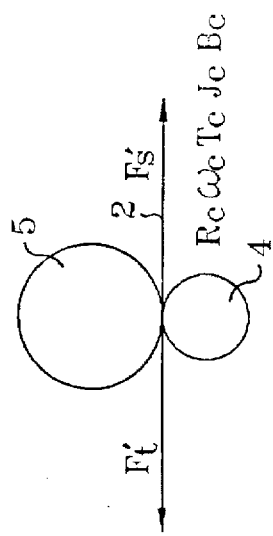
FIG. 3 shows a state where a capstan motor shaft contacts a pinch roller closely in FIG. 2.

FIG. 3 is an enlarged view of a portion "A" in FIG. 2, showing a state where a capstan motor shaft 4 contacts a pinch roller 5 closely centering on tape 2.

The parameters expressed in FIG. 2 will be described below.

Parameters $\mu_s$ and $\mu_t$ represent frictional coefficients between the capstan motor and the respective reel motors, in which the parameter $\mu_s$ represents a tape frictional coefficient from a supply reel to the capstan motor, and the parameter $\mu_t$ is a tape frictional coefficient from a take-up reel to the capstan motor. Parameter $F_s$ and $F_t$ represent forces pulling the respective reel motors, in which $F_s$ is a tension of the tape in the supply reel side, and $F_t$ is a tension of the tape in the take-up reel side. $\omega_r$, $\omega_t$ and parameter $\omega_c$ represent rotational angular speeds of the respective motors, in which $\omega_r$ is a rotational angular speed of a supply reel motor 7, $\omega_t$ is a rotational angular speed of a take-up reel motor 8, and $\omega_c$ is a rotational angular speed of a capstan motor. Parameter $T_d$ represents a tension of the tape toward drum 3 which is detected by tension pole 1.

The parameters expressed in FIG. 3 will be described below.

A parameter $F_s'$ represents a force pulling the tape toward the supply reel centered on the capstan motor shaft 4 and pinch roller 5 and a parameter $F_t'$ represents a force pulling the tape toward the take-up reel also centered on the capstan motor shaft 4 and pinch roller 5. A parameter $R_c$ represent a radius of the capstan motor shaft. A parameter $\omega_c$ represents a rotational angular speed of the capstan motor. A parameter $T_c$ represents a rotational torque of the capstan motor. Another parameter, $J_c'$ represents an inertial moment of the capstan motor. Finally a parameter, $B_c'$ represents a damping constant of the capstan motor.

The basic principle of the present invention will be described below numerically using the above described parameters.

First, the motional equation with respect to the capstan motor shaft 4 is expressed below as the equation (1). Regarding equation (1), the pinch roller 5 is in a state where it contacts the capstan motor shaft 4 closely during the reproduction of video information from the tape (see FIG. 3). The motional equation is as follows $$J_c \frac{d\omega_c}{dt} + B_c \omega_c = T_c + (F_t' - F_s')R_c \qquad (1)$$

In general, since the tape speed in the VCR is constant, the value of $\omega_c$ is kept nearly constant so that the value of $$\frac{d\omega_c}{dt}$$

is very small. Thus, if the VCR is controlled so that the value of the control equation $$F_t' = F_s' + \frac{B_c}{R_c} \omega_c,$$

is satisfied equation (1) will simplify to the equation, $$J_c \frac{d\omega_c}{dt} = T_c.$$

As described above, when the value $$\frac{d\omega_c}{dt}$$

becomes very small, the torque $T_c$ applied to the capstan motor becomes small.

The discussion above relating to equation (1) assumes that certain conditions in the servo system of the VCR are controlled so the equation $$F_t' = F_s' + \frac{B_c}{R_c} \omega_c$$

is satisfied, the equation being called a control equation according to the present invention.

As described above, the present invention directly detects the tension of the tape and actively controls the take-up reel motor. Accordingly, the force $F_t'$ of the tape in the take-up reel can be set equal to the force $F_s'$ of the tape in the supply reel, the two forces $F_t'$ and $F_s'$ being centered on the capstan motor. If the VCR servo control system is designed so that term $$\frac{B_c}{R_c} \omega_c$$

is minimized, the control equation of the present invention is satisfied by the servo control system shown in FIG. 2.

In designing the second tension controller 15 of the present invention, a relationship is established based on the control equation of the present invention using the parameters $F_s'$, $F_t'$ and $R_c$ presented in equation (1), the input parameters $T_d$ and $\omega_c$ related to the second tension controller, and the parameters $T_t$, $R_t$ and $F_t$ related to the take-up reel motor 8. Here, $T_t$ is a torque of take-up reel motor 8 and $R_t$ is a radius of take-up reel motor 8.

Centered on the capstan motor shaft 4 and the pinch roller 5, is force $F_s'$ which pulls the tape in the direction of the the supply reel and tension $T_d$ of the tape toward drum 3. Force $F_s$ and tension $T_d$ have the following relationship with frictional coefficient $\mu_s$ as expressed in equation (2).

$$F_s' = (1+\mu_s) T_d \quad (2)$$

The force $F_t$, which pulls the tape in the take-up reel and the tension force $F_t'$, which pulls the tape in the direction of the take-up reel are centered on capstan motor shaft 4 and pinch roller 5 and have the following relationship with the frictional coefficient $\mu_t$ as expressed in equation (3) as follows.

$$F_t' = (1+\mu_t) F_t \quad (3)$$

The torque, torque $T_t$ of the take-up reel motor 8 is defined by the following equation (4) using force $F_t$, which pulls the tape in the take-up reel motor, and a radius $R_t$ of the take-up reel motor.

$$T_t = F_t R_T \quad (4)$$

Since the tape 2 is connected to the capstan motor shaft 4 and the take-up reel motor 8, both $\omega_c \cdot R_c$ and $\omega_r \cdot R_t$ are the same as the linear speed of the tape. Thus, the following equation (5) is established, $$\omega_c \cdot R_c = \omega_r \cdot R_t \quad (5)$$

If $F_t$ of equation (4) is substituted by equation (3), the following equation (6) is obtained:

$$T_t = \{(1+\mu_t) F_t'\} \cdot R_t \quad (6)$$

If $F_t'$ of equation (6) is substituted by the control equation of the present invention, that is, $$F_t' = F_s' + \frac{B_c}{R_c} \omega_c,$$

the following equation (7) is obtained:

$$T_t = \left[ (1+\mu_t) \cdot \left\{ F_s' + \frac{B_c}{R_c} \omega_c \right\} \right] \cdot R_t \quad (7)$$

If $F_s'$ of equation (7) is substituted by equation (2), the following equation (8) is obtained:

$$T_t = (1+\mu_t) \cdot \left\{ (1+\mu_s) \cdot T_d \cdot R_t + \frac{R_t}{R_c} \cdot B_c \cdot \omega_c \right\}. \quad (8)$$

Finally, if equation (8) is arranged using equation (5), the following equation (9) is obtained:

$$T_t = (1+\mu_t) \cdot \left\{ (1+\mu_s) \cdot T_d \cdot \frac{\omega_c}{\omega_r} \cdot R_c + B_c \cdot \frac{\omega_c}{\omega_r} \cdot \omega_c \right\} \quad (9)$$

The above equation (9) is obtained by using the control equation of the present invention, that is, $$F_t' = F_s' + \frac{B_c}{R_c} \omega_c$$

and equations (2) through (5) which represent the relationships between the parameters of the servo system according to the present invention. The second tension controller of the present invention operates in accordance with equation (9).

Figure 4:
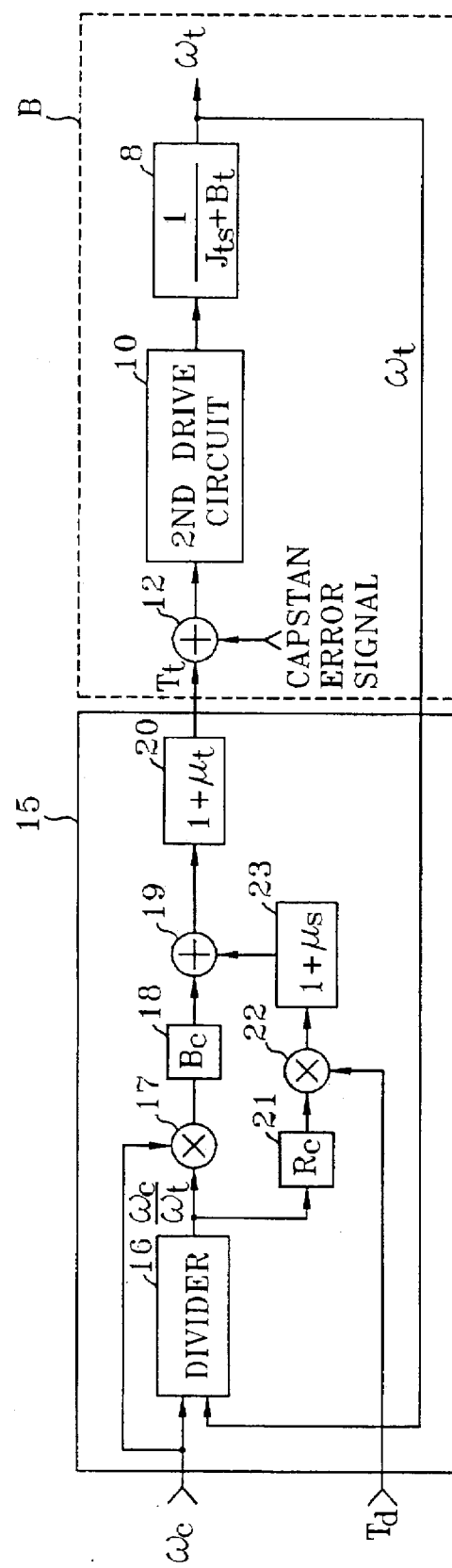
FIG. 4 is a block diagram showing a detailed structure of a second tension controller in FIG. 2.

FIG. 4 is a block diagram showing the detailed structure of a second tension controller depicted in FIG. 2. In FIG. 4, a portion "B" includes the adder 12, the second drive circuit 10 and the take-up reel motor 8 shown in FIG. 2. The rotational angular speed $\omega_r$ of the take-up reel motor 8 is input to second tension controller 15. Here, the detailed structure of the second tension controller 15 will be described.

The second tension controller 15 receives the rotational angular speed $\omega_c$ of the capstan motor, tension $T_d$ of the tape which is detected using tension pole 1, and the rotational angular speed $\omega_r$ of take-up reel motor 8, and outputs the torque $T_t$ of the take-up reel motor as a control signal. The detailed structure of the second tension controller of which the input and output satisfy equation (9) is described as follows.

Rotational angular speed $\omega_c$ of the capstan motor is applied to divider 16 and first multiplier 17, respectively. Here, rotational angular speed $\omega_r$ of take-up reel motor 8 is input to divider 16 which outputs ($W_c/W_r$) to first multiplier 17. Second multiplier 18 outputs $$B_c \cdot \left( \frac{\omega_c}{\omega_r} \right) \cdot \omega_c$$

which results from the input signal multiplied by a predetermined value $B_c$, to adder 19. Meanwhile, a third multiplier 21 multiplies the input $W_c/W_r$ from the divider 16 by a predetermined value $R_c$ and outputs the multiplication result, that is, $$\left( \frac{\omega_c}{\omega_r} \right) \cdot R_c$$

to a fourth multiplier 22. Since the tension $T_d$ of the tape detected in the tension pole is input to the fourth multiplier 22. The output of the fourth multiplier 22

$$T_d \cdot \left( \frac{\omega_c}{\omega_r} \right) \cdot R_c$$

is input to a fifth multiplier 23. The fifth multiplier 23 multiplies the input by a predetermined value $1+\mu_r$ and outputs the result, that is, $$(1+\mu_r) \cdot T_d \cdot \left( \frac{\omega_c}{\omega_r} \right) \cdot R_c$$

to an adder 19.

Adder 19 adds the inputs $$B_c \cdot \left( \frac{\omega_c}{\omega_r} \right) \cdot \omega_c$$

from the second adder 18 and the input $$(1+\mu_r) \cdot T_d \cdot \left( \frac{\omega_c}{\omega_r} \right) \cdot R_c$$

from the fifth multiplier 23 and outputs the addition result, $$\left[ (1+\mu_r) \cdot T_d \cdot \left( \frac{\omega_c}{\omega_r} \right) \cdot R_c + B_c \left( \frac{\omega_c}{\omega_r} \right) \cdot \omega_c \right]$$

to a sixth multiplier 20. The sixth multiplier 20 outputs a value resulting from the input multiplied by a predetermined value $1+\mu_t$ as a final result output by the second tension controller 15.

The second tension controller 15 having the above detailed structure outputs a value of torque, corresponding to the formula $$T_t = (1+\mu_t) \cdot \left\{ (1+\mu_r) \cdot T_d \cdot \frac{\omega_c}{\omega_r} \cdot R_c + B_c \cdot \frac{\omega_c}{\omega_r} \cdot \omega_c \right\},$$

in the take-up reel motor which satisfies equations (2) through (5) and the control equation, $$F_t' = F_s' + \frac{B_c}{R_c} \omega_c,$$

using the above-mentioned parameters of the servo system of the present invention.

As described above, the method and apparatus for implementing servo control in a VCR according to the present invention, controls the servo system of a VCR to satisfy the control equation $$F_t' = F_s' + \frac{B_c}{R_c} \omega_c.$$

Also, a tension of a tape is directly detected to actively control a take-up reel motor in order to make a tension $F_t'$ of the tape in the take-up reel motor side and a tension $F_s'$ of the tape in a supply reel side equal each other, tension $F_t'$ and $F_s'$ being centered with respect to a capstan motor. In addition, a servo system of the VCR is designed so that a term $$\frac{B_c}{R_c} \omega_c$$

embodied in the servo system of the VCR is minimized. If the servo system is controlled so that the control equation $$F_t' = F_s' + \frac{B_c}{R_c} \omega_c$$

is satisfied, as in the present invention, equation (1) simplifies to the following equation, $$J_c \frac{d\omega_c}{dt} = T_c,$$

in which $$\frac{d\omega_c}{dt}$$

is made very small in order to decrease the torque $T_c$ applied to the capstan motor.

While only certain embodiments of the invention have been specifically described herein, it will apparent that numerous modifications may be made thereto without departing from the spirit and scope of the invention.

What is claimed is:

1. A method for implementing servo control in a video cassette recorder (VCR) in which reel motors pull a tape so that a tension is produced in the tape when the tape travels at a constant speed in accordance with the action of a capstan motor, said servo control method comprising:

controlling the VCR to meet the following control equation:

$$F_t' = F_s' + \frac{B_c}{R_c} \omega_c$$

wherein $F_t'$ is a force pulling the tape toward a take-up reel motor that is centered on the capstan motor, $F_s'$ is a force pulling the tape toward a supply reel motor that is centered on the capstan motor, $B_c$ is a damping constant of the capstan motor, $R_c$ represents a radius of a shaft of the capstan motor, and $\omega_c$ is a rotational angular speed of the capstan motor.

2. A method for implementing servo control in a video cassette recorder according to claim 1, wherein controlling the VCR further comprises:

directly detecting a tension of the tape in order to actively control a take-up reel motor so as to make the tension $F_t'$ and the tension $F_s'$ equal to each other; and minimizing a term, $$\frac{B_c}{R_c} \omega_c,$$

of the control equation.

3. A method for implementing servo control in a video cassette recorder according to claim 2, wherein controlling the VCR further comprises:

controlling a torque ($T_t$) of the take-up reel motor to satisfy, in accordance with the control equation, the following equation:

$$T_t = (1+\mu_t) \cdot \left\{ (1+\mu_s) \cdot T_d \cdot \frac{\omega_c}{\omega_t} \cdot R_c + B_c \cdot \frac{\omega_c}{\omega_t} \cdot \omega_c \right\};$$

wherein $\mu_t$ is a tape frictional coefficient from a take-up reel to the capstan motor, $\mu_s$ is a tape frictional coefficient from a supply reel to the capstan motor, $T_d$ is a tension of the tape, and $\omega_t$ is a rotational angular speed of the take-up reel motor.

4. A method for implementing servo control in a video cassette recorder (VCR) according to claim 1, wherein during the step of controlling, $F_t'$ and $F_s'$ are centered on a capstan motor shaft of the capstan motor and a pinch roller of the VCR, said capstan motor shaft and said pinch roller directly contacting each other.

5. An apparatus for implementing servo control in a video cassette recorder (VCR) which pulls a tape to maintain a constant tension in the tape by controlling at least one reel motor drive in accordance with a detected tape tension and rotational angular speeds of reel motors when a capstan motor causes the tape to move at a constant speed, said servo control apparatus comprising:

a tension controller, associated with a take-up reel motor, wherein a torque of the take-up reel motor is calculated according to the detected tape tension, a rotational angular speed of the capstan motor, and a rotational angular speed of the take-up reel motor;

wherein the take-up reel motor is driven in accordance with the torque of the take-up reel so as to make a first tension of the tape in a direction of the take-up reel motor and a second tension of the tape in a direction of a supply reel motor equal each other, said first and second tensions being centered on the capstan motor, wherein said tension controller associated with the take-up reel motor receives a tension of the tape ($T_d$), a rotational angular speed ($\omega_c$) of the capstan motor, and a rotational angular speed ($\omega_t$) of the take-up reel motor, and outputs the torque of the take-up reel motor in accordance with the following equation:

$$T_t = (1+\mu_t) \cdot \left\{ (1+\mu_s) \cdot T_d \cdot \frac{\omega_c}{\omega_t} \cdot R_c + B_c \cdot \frac{\omega_c}{\omega_t} \cdot \omega_c \right\}$$

in which $\mu_t$ is a tape frictional coefficient from the take-up reel to the capstan motor, $\mu_s$ is a tape frictional coefficient from a supply reel to the capstan motor, $R_c$ is an axial radius of the capstan motor, and $B_c$ is a damping constant of the capstan motor, wherein $\mu_t$, $\mu_s$, $R_c$, and $B_c$ are predetermined parameters in the servo control system.

6. An apparatus for implementing servo control in a video cassette recorder (VCR) which pulls a tape to maintain a constant tension in the tape by controlling at least one reel motor drive in accordance with a detected tape tension and rotational angular speeds of reel motors when a capstan motor causes the tape to move at a constant speed, said servo control apparatus comprising:

a tension controller, associated with a take-up reel motor, wherein a torque of the take-up reel motor is calculated according to the detected tape tension, a rotational angular speed of the capstan motor, and a rotational angular speed of the take-up reel motor;

wherein the take-up reel motor is driven in accordance with the torque of the take-up reel so as to make a first tension of the tape in a direction of the take-up reel motor and a second tension of the tape in a direction of a supply reel motor equal each other, said first and second tensions being centered on the capstan motor.

7. An apparatus for implementing servo control in a video cassette recorder (VCR) according to claim 6, wherein the capstan motor further comprises a capstan motor shaft which directly contacts a pinch roller of the VCR, the first and second tensions being centered on the capstan motor shaft and the pinch roller.

8. An apparatus for implementing servo control in a video cassette recorder (VCR) according to claim 6, wherein the detected tape tension is detected using a tension pole of the VCR.

\* \* \* \* \*